United States Patent
Rahman (10) Patent No.: US 11,665,529 B2
(45) Date of Patent: May 30, 2023

(54) MODULAR CAPABILITY REPORTING IN WIRELESS COMMUNICATIONS

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 148 days.

(21) Appl. No.: 17/321,818

(22) Filed: May 17, 2021

(65) Prior Publication Data

US 2022/0369100 A1   Nov. 17, 2022

(51) Int. Cl.
| | |
|---|---|
| *H04W 4/00* | (2018.01) |
| *H04W 8/24* | (2009.01) |
| *H04W 36/08* | (2009.01) |
| *H04W 68/00* | (2009.01) |

(52) U.S. Cl.
CPC ............. *H04W 8/24* (2013.01); *H04W 36/08* (2013.01); *H04W 68/005* (2013.01)

(58) Field of Classification Search
CPC ...... H04W 8/24; H04W 36/08; H04W 68/005
See application file for complete search history.

(56) References Cited

U.S. PATENT DOCUMENTS

| | | | |
|---|---|---|---|
| 5,822,693 A | 10/1998 | Harrison | |
| 5,983,117 A | 11/1999 | Sandler et al. | |
| 7,039,425 B1 | 5/2006 | Mazawa et al. | |
| 7,536,167 B2 | 5/2009 | Gollnick et al. | |
| 7,974,627 B2 | 7/2011 | Mia et al. | |
| 8,116,808 B2 | 2/2012 | Amine | |
| 8,160,626 B2 | 4/2012 | Shan et al. | |
| 8,289,922 B2 | 10/2012 | Ewe et al. | |
| 8,571,566 B2 | 10/2013 | Li et al. | |
| 8,606,257 B2 | 12/2013 | Li | |
| 8,676,118 B2 | 3/2014 | Sheynblat | |
| 8,750,807 B2 | 6/2014 | Lin et al. | |
| 8,861,549 B2 | 10/2014 | Koorapaty et al. | |
| 8,977,303 B2 | 3/2015 | Fang et al. | |
| 8,983,448 B2 | 3/2015 | Jang et al. | |
| 8,989,807 B2 | 3/2015 | Schmidt et al. | |

(Continued)

FOREIGN PATENT DOCUMENTS

| | | |
|---|---|---|
| EP | 3337234 B1 | 3/2021 |
| WO | 2020244911 A1 | 12/2020 |

OTHER PUBLICATIONS

International Searching Authority, International Search Report and Written Opinion, PCT Patent Application PCT/US2022/029040, dated Sep. 15, 2022, 9 pages.

(Continued)

*Primary Examiner* — Justin Y Lee
(74) *Attorney, Agent, or Firm* — Perkins Coie LLP (57) ABSTRACT

Methods, devices, and systems related to wireless communications are disclosed. In one example aspect, a device for wireless communication includes a processor that is configured to receive an enquiry message from a base station enquiring capability information of the terminal device and transmit a response message to the base station indicating one or more templates of capability information determined according the one or more radio access technologies and a list of frequency bands.

18 Claims, 5 Drawing Sheets

(56) References Cited

U.S. PATENT DOCUMENTS

| | | |
|---|---|---|
| 9,226,136 B2 | 12/2015 | Kim et al. |
| 9,271,166 B2 | 2/2016 | Kazmi et al. |
| 9,356,765 B2 | 5/2016 | Wang et al. |
| 9,456,337 B2 | 9/2016 | Amerga et al. |
| 9,479,975 B2 | 10/2016 | Ganapathy et al. |
| 9,554,283 B2 | 1/2017 | Tabet et al. |
| 9,615,354 B2 | 4/2017 | Hooli et al. |
| 9,686,007 B2 | 6/2017 | Braz et al. |
| 9,839,019 B2 | 12/2017 | Webb et al. |
| 9,848,311 B1 | 12/2017 | Grier et al. |
| 9,888,478 B2 | 2/2018 | Kim et al. |
| 10,015,693 B2 | 7/2018 | Zhang et al. |
| 10,051,557 B2 | 8/2018 | Xie et al. |
| 10,470,118 B2 | 11/2019 | Horn et al. |
| 10,531,441 B2 | 1/2020 | Wong |
| 10,616,823 B2 | 4/2020 | Bucknell et al. |
| 2009/0279503 A1 | 11/2009 | Chin et al. |
| 2011/0243094 A1 | 10/2011 | Dayal et al. |
| 2013/0094446 A1 | 4/2013 | Swaminathan |
| 2015/0055572 A1 | 2/2015 | Ishikura et al. |
| 2015/0181575 A1 | 6/2015 | Ng et al. |
| 2016/0198398 A1 | 7/2016 | Chen et al. |
| 2019/0053130 A1 | 2/2019 | Guo et al. |
| 2020/0084797 A1 | 3/2020 | Marjelund |
| 2020/0092879 A1 | 3/2020 | Wu |
| 2020/0133597 A1* | 4/2020 | Ishida ................... G06F 3/1257 |
| 2020/0413247 A1 | 12/2020 | Van Lieshout et al. |
| 2021/0029618 A1 | 1/2021 | Jain et al. |
| 2021/0051653 A1 | 2/2021 | Park et al. |
| 2022/0182816 A1* | 6/2022 | Kuang ............. H04W 72/0453 |

OTHER PUBLICATIONS

3GPP; TSG RAN; NR; RRC protocol specification (Release 16), 3GPP TS 38.331 V16.4.1, Mar. 30, 2021. 954 pages.

* cited by examiner

MODULAR CAPABILITY REPORTING IN WIRELESS COMMUNICATIONS

BACKGROUND

In wireless communications, the network and the terminal devices need to understand each other's capabilities in order to perform transmissions appropriately. As communication technologies advance, however, capability reporting has become increasingly complex, leading to signaling overhead and processing delay that can hinder efficient communications.

BRIEF DESCRIPTION OF THE DRAWINGS

Detailed descriptions of implementations of the present invention will be described and explained through the use of the accompanying drawings.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

With the advancement in wireless communication technology, the size of capability information has increased noticeably. Correspondingly, signaling the base station capability (e.g., system information) and UE capability has brought significant signaling overhead and higher processing load to the network. As generations of wireless communication technologies emerge, such as the Fifth-Generation (5G) and the Sixth-Generation (6G) wireless technologies, the size and complexity of capability information can cause significant delay in connection establishments. Similarly, radio and core network capabilities broadcast by the base stations are becoming more and more complex. The techniques disclosed herein can be implemented to provide a modular design of capability reporting for both the base station and the UE, thereby greatly reducing the signaling overhead and processing load and ensuring efficient connection establishments and re-establishment between terminal devices and the network(s).

Wireless Communications System

Figure 1:
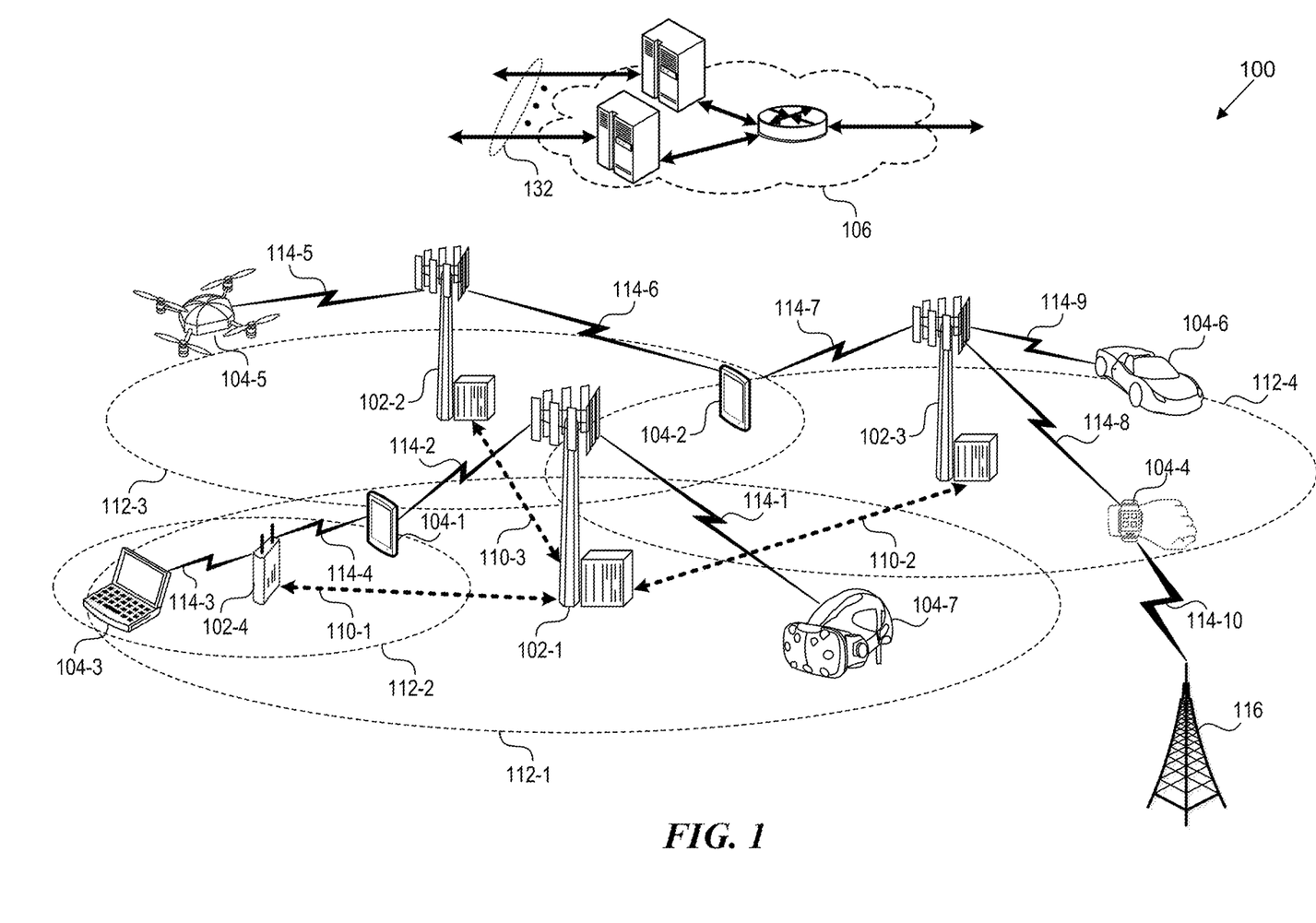
FIG. 1 is a block diagram that illustrates a wireless communications system.

FIG. 1 is a block diagram that illustrates a wireless telecommunication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The system 100 can include any combination of NANs including an access point, radio transceiver, gNodeB (gNB), NodeB, eNodeB (eNB), Home NodeB or eNodeB, or the like. In addition to being a WWAN base station, a NAN can be a WLAN access point, such as an Institute of Electrical and Electronics Engineers (IEEE) 802.11 access point.

The NANs of a network formed by the system 100 also include wireless devices 104-1 through 104-8 (referred to individually as "wireless device 104" or collectively as "wireless devices 104") and a core network 106. The wireless devices 104-1 through 104-8 can correspond to or include network entities capable of communication using various connectivity standards. For example, a 5G communication channel can use millimeter wave (mmW) access frequencies of 28 GHz or more. In some implementations, the wireless device 104 can operatively couple to a base station 102 over a Long-Term Evolution (LTE)/LTE Advanced (LTE-A) communication channel, which is referred to as a 4G communication channel. In some implementations, the base station 102 can provide network access to a Fifth-Generation (5G) communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links 108 (e.g., S1 interfaces) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC)), etc.

The system 100 can include a 5G network and/or an LTE/LTE-A or other network. In an LTE/LTE-A network, the term eNB is used to describe the base stations 102 and in 5G new radio (NR) networks, the term gNBs is used to describe the base stations 102 that can include mmW communications. The system 100 can thus form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices with service subscriptions with a wireless network service provider. As indicated earlier, a small cell is a lower-powered base station, as compared with a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices with service subscriptions with the network provider. A femto cell covers a relatively smaller geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), a portable gaming console, or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some implementations, the communication links 114 include LTE and/or mmW communication links.

In some implementations of the system 100, the base stations 102 and/or the wireless devices 104 include multiple antennas for employing antenna diversity schemes to improve communication quality and reliability between base stations 102 and wireless devices 104. Additionally, or alternatively, the base stations 102 and/or the wireless devices 104 can employ multiple-input, multiple-output (MIMO) techniques that can take advantage of multi-path environments to transmit multiple spatial layers carrying the same or different coded data.

Modular Capability Reporting

Figure 2:
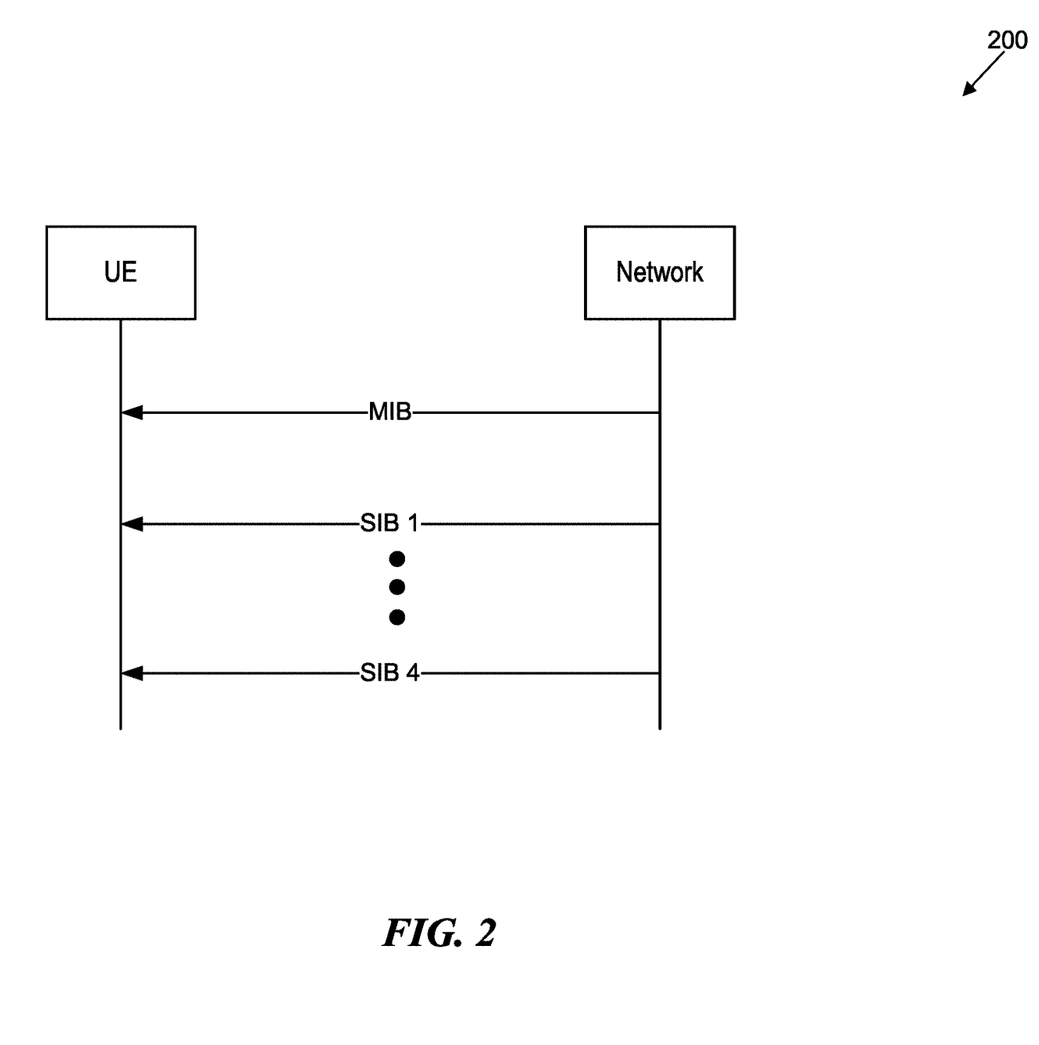
FIG. 2 illustrates an example call flow for system information acquisition.

To allow a User Equipment (UE) to establish a connection with a base station, the base station broadcasts its capability information, such as system frame number, subcarrier spacing, intra-frequency reselection, in the system information. FIG. 2 illustrates an example call flow 200 for system information acquisition. Given the information provided on the broadcast channel, the UE can have a valid version of the Master Information Block (MIB), System Information Block 1 (SIB1) through SIB4, and SIB5 if the UE supports LTE communication. As wireless communication technology advances, more and more system information blocks (SIBs) have been introduced to the Third-Generation Partnership Project (3GPP) standard. Currently, the 3GPP standard defines nine SIBs in total: SIB1 to SIB9 representing different types of information that facilitate communications with the cells/base stations.

Figure 3:
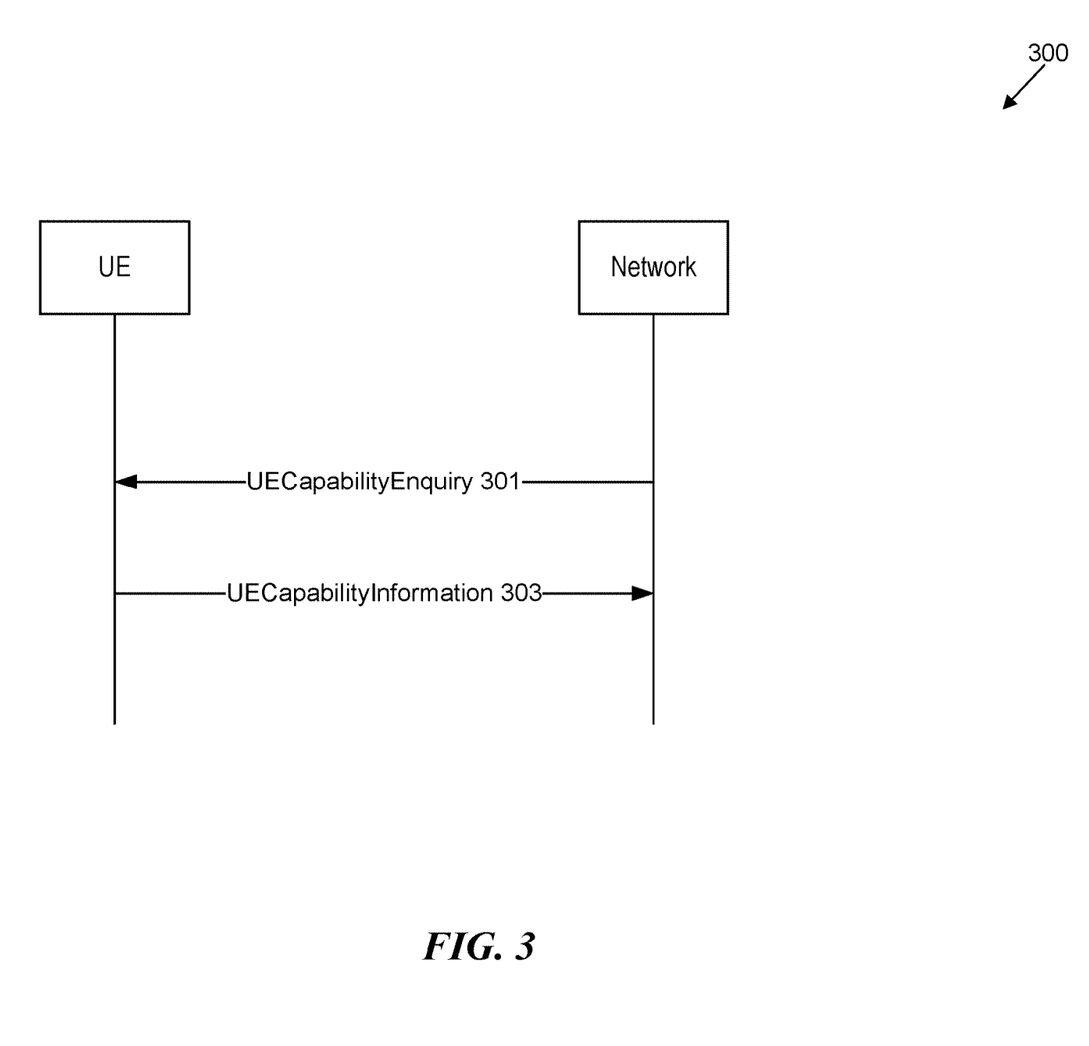
FIG. 3 illustrates an example call flow for User Equipment (UE) capability transfer.

When a UE establishes a connection with a base station, it also informs the base station of its capabilities. FIG. 3 illustrates an example call flow 300 for UE capability transfer. The network initiates the UE capability transfer procedure when it needs the UE radio access information by sending a UECapabilityEnquiry message 301. The content of UECapabilityEnquiry information element is defined by the 3GPP standard as follows:

```
UECapabilityEnquiry information element
-- ASN1START
-- TAG-UECAPABILITYENQUIRY-START
UECapabilityEnquiry ::= SEQUENCE {
rrc-TransactionIdentifier RRC-TransactionIdentifier,
criticalExtensions CHOICE {
ueCapabilityEnquiry UECapabilityEnquiry-IEs,
criticalExtensionsFuture SEQUENCE { }
}
}
UECapabilityEnquiry-IEs ::= SEQUENCE {
ue-CapabilityRAT-RequestList UE-CapabilityRAT-RequestList,
lateNonCriticalExtension OCTET STRING OPTIONAL,
ue-CapabilityEnquiryExt OCTET STRING (CONTAINING
UECapabilityEnquiry-v1560-
IEs) OPTIONAL
}
UECapabilityEnquiry-v1560-IEs ::= SEQUENCE {
capabilityRequestFilterCommon UE-CapabilityRequestFilterCommon
OPTIONAL, --
Need N
nonCriticalExtension SEQUENCE{ } OPTIONAL
}
-- TAG-UECAPABILITYENQUIRY-STOP
-- ASN1STOP
-- ASN1START
-- TAG-UE-CAPABILITYRAT-REQUESTLIST-START
UE-CapabilityRAT-RequestList ::= SEQUENCE (SIZE (1..maxRAT-
CapabilityContainers)) OF UE-CapabilityRAT-Request
UE-CapabilityRAT-Request ::= SEQUENCE {
rat-Type RAT-Type,
capabilityRequestFilter OCTET STRING OPTIONAL, -- Need N
...
}
-- TAG-UE-CAPABILITYRAT-REQUESTLIST-STOP
-- ASN1STOP
-- TAG-UE-CAPABILITYREQUESTFILTERNR-START
UE-CapabilityRequestFilterNR ::= SEQUENCE {
frequencyBandListFilter FreqBandList OPTIONAL, -- Need N
nonCriticalExtension UE-CapabilityRequestFilterNR-v1540 OPTIONAL
}
UE-CapabilityRequestFilterNR-v1540 ::= SEQUENCE {
srs-SwitchingTimeRequest ENUMERATED {true} OPTIONAL, --
Need N
nonCriticalExtension SEQUENCE { } OPTIONAL
}
-- TAG-UE-CAPABILITYREQUESTFILTERNR-STOP
-- ASN1STOP
```

Based on the information included in UECapabilityEnquiry message 301, the UE sets the contents of UECapabilityInformation message 303 accordingly as defined in the 3GPP standard. Similar to the evolution of SIBs, the UECapabilityInformation message has grown to become one of the most complex messages in Radio Resource Control (RRC) layer. For example, the 3GPP standard TS 38.331 includes over 40 pages of information element definitions for UE capability information elements. Due to message size and/or list size constraints, the UE may not even be able to include all feature sets or feature set combinations that it supports. Signaling the UE capability now brings significant signaling overhead and decoding delay during the connection establishment.

This patent document discloses techniques that can be implemented to provide a modular design for capability reporting so as to reduce the size of capability signaling to several bits. Using the disclosed technology, the base station and the UE can exchange capability information without incurring significant signaling overhead, leading to efficient and reliable connection establishments and re-establishments. In particular, call setup failures in call transitions (e.g., from 5G to 4G system transition) caused by instability in capability reporting can be greatly reduced or eliminated.

Using UE capability reporting as an example, currently the UE determines the contents of UECapabilityInformation based on the radio access technologies (RATs) (e.g., 4G only, 4G-5G, or 5G only), band combinations, and feature set(s) combinations that it supports. The UE compiles a list of candidate band combinations, feature sets, and feature set combinations according to the frequency band list provided by the base station and the RAT type. For example, if the UE supports 4G communications only, 5G-only band combinations are removed from the list of candidate combinations. Details regarding the UE behavior for capability report can be found in the 3GPP standard TS 38.331.

Often times, devices provisioned for a particular geographical location or a particular network operator share similar band parameters and feature sets. Therefore, instead of solely relying on the UE to determine the band combinations, feature sets, and/or feature set combinations as the time of capability reporting, templates can be provided (e.g., by network operators or by the 3GPP standard) based on the frequency bands and/or the RAT type. For example, frequency band information and the RAT information can be jointly coded to correspond to different capability templates. The 3GPP standard currently defines the RAT type to be NR for 5G-only connectivity, EUTRA-NR for both 4G and 5G connectivity, and EUTRA for 4G-only connectivity. Additional fields can be used to represent legacy RAT types such as 2G and/or 3G connectivity. Table 1 shows an example joint coding of frequency bands and RAT type that corresponds to a few capability templates.

TABLE 1

Example mapping of UE capability templates to RAT and frequency bands

| Template Indices | Low-frequency bands | Medium-frequency bands (e.g., frequency range 1) | High-frequency bands (e.g., frequency range 2) |
|---|---|---|---|
| 2G/3G Legacy | 0 | 1 | — |
| 4G (EUTRA) | 2 | 3 | 4 |
| 4G-5G (EUTRA-NR) | 5 | 6 | 7 |
| 5G (NR) | 8 | 9 | 10 |

Based on the RAT type and/or the frequencyBandListFilter provided in the UECapabilityEnquiry message, a corresponding template can be selected. The template includes the appropriate band combinations, feature set, and feature set combinations that need to be reported to the base station. Table 2 shows an example template for UEs that are capable of 5G-only communications in medium frequency bands.

TABLE 2

Example Capability Template for 5G (NR)
RAT type and medium frequency bands

| | |
|---|---|
| Access Stratum | Rel15 |
| PDCP Parameters | supportedROHC-Profiles=profile0x0002, maxNumberROHC-ContextSessions = cs16 |
| PHY Parameters | dynamicPRB-BundlingDL=supported,sp-CSI-ReportPUCCH=supported, etc. |
| RF Parameters | supportedBandListNR={band1, band2, band3, band4, ...}, extendedCP=support, etc. |
| Fr1-Add-UE-NR-Capabilities | simultaneousRxDataSSB-DiffNumerology=supported |
| featureSetCombinations | {{downlinkSetNR=1, uplinkSetNR=2}, {downlinkSetNR=2, uplinkSetNR=3}} |

A template can be represented using a few bits. For example, a total number of 16 templates can be represented using 4 bits. Thus, instead of encoding the complete list of capability entries, ue-CapabilityRAT-Container can simply include several bits to indicate which capability template corresponding to the UE's capability information can be used for subsequent communications.

```
-- ASN1START
-- TAG-UECAPABILITYINFORMATION-START
UECapabilityInformation ::= SEQUENCE {
rrc-TransactionIdentifier RRC-TransactionIdentifier,
criticalExtensions CHOICE {
ueCapabilityInformation UECapabilityInformation-IEs,
criticalExtensionsFuture SEQUENCE { }
}
}
UECapabilityInformation-IEs ::= SEQUENCE {
ue-CapabilityRAT-ContainerList UE-CapabilityRAT-ContainerList
OPTIONAL,
lateNonCriticalExtension OCTET STRING OPTIONAL,
nonCriticalExtension SEQUENCE{ } OPTIONAL
}
-- TAG-UECAPABILITYINFORMATION-STOP
-- ASN1STOP
-- ASN1START
-- TAG-UE-CAPABILITYRAT-CONTAINERLIST-START
UE-CapabilityRAT-ContainerList ::= SEQUENCE (SIZE (0..maxRAT-
CapabilityContainers)) OF UE-CapabilityRAT-Container
UE-CapabilityRAT-Container ::= SEQUENCE {
rat-Type RAT-Type,
ue-CapabilityRAT-Container OCTET STRING
}
-- TAG-UE-CAPABILITYRAT-CONTAINERLIST-STOP
-- ASN1STOP
```

In some embodiments, the UECapabilityEnquiry information element can include inquiry regarding capability extensions (e.g., ue-CapabilityEnquiryExt). For example, the base station can request to know whether the UE supports various types of dual connectivity (DC), such as EN-DC (EUTRA-NR Dual Connectivity), NE-DC (NR-EUTRA Dual connectivity), and/or NR-DC (NR-NR dual connectivity). The DC capabilities can correspond to existing or additional templates that include the appropriate band combinations, feature set, and feature set combinations. For example, UEs that support EN-DC or NE-DC can select template 6 (EUTRA-NR with operating frequency range 1) in the reporting. As another example, one or more additional templates (e.g., template 11 and/or 12) can be added for UEs that support EN-DC and/or NE-DC, or any additional features (e.g., network slicing) for future generations of communication technology.

In some embodiments, UEs that are provisioned for different network operators can support different customized feature sets. The customized features or feature sets can be jointly coded with RAT type and frequency bands. Alternatively, or in addition, a few additional bits can be used to represent templates that are specific to each network operator. In some embodiments, the templates can be further coded or grouped based on whether the usage is voice (e.g., cell phone devices) or data (e.g., for pads or Internet of Things, IOT, devices). For example, a single bit can be used to distinguish whether a template is suitable for a device that is capable of both voice and data usage or is capable of data usage only. Different templates can be predefined or pre-configured according to the usage types. In some embodiments, instead of creating a complete template for all existing capability information elements, different sub-templates can be used to represent groups of information elements. For example, a first set of templates can be created for a subset of information elements that are associated with different RAT types. A second set of templates can be created for features such as DC support or network slicing. As shown below, different templates can be concatenated together to represent the full capability of the UE, each represented using a few bits (e.g., 1-4 bits). The total length of ue-CapabilityRAT-Container field can be smaller than 32 bits, thereby greatly reducing the signaling overhead of the UE capabilities.

ue-CapabilityRAT-Container OCTET STRING = N bits representing a first
template for RAT-related capabilities | M bits representing a second template
for DC support | K bits representing a template for network slicing support |
L bits representing a template for carrier specific features Similar approach can be adopted in system information design. Templates for system information can be created by jointly coding RAT types, network operator specific features, and/or extensions supported by a particular cell. In some embodiments, system information can be organized into groups, and different templates can be created for each group. Such techniques allow the system information to be represented using only a few bits, thereby reducing signaling overhead for broadcast and connection establishments.

For example, SIB2 contains cell re-selection information common for intra-frequency, inter-frequency and/or inter-RAT cell re-selection as well as intra-frequency cell re-selection information other than neighboring cell related, SIB3 contains neighboring cell related information relevant only for intra-frequency cell re-selection, SIB4 contains information relevant only for inter-frequency cell re-selection, SIB5 contains information relevant only for inter-RAT cell re-selection. Therefore, SIB2 to SIB4 can be grouped together—a few bits representing different templates corresponding to different cell re-selection features can be broadcast by the base station. The remaining SIBs are unrelated to cell re-selection (e.g., SIB6 contains an Earthquake and Tsunami Warning System, ETWS, primary notification, SIB7 contains an ETWS secondary notification, SIB8 contains a Commercial Mobile Alert Service notification, and SIB9 contains information related to GPS time and Coordinated Universal Time). Additional templates can be created for SIB5 to SIB9 to represent various types of warning or notifications. The amount of information that needs to be transmitted on the broadcast channel can be greatly reduced.

Figure 4:
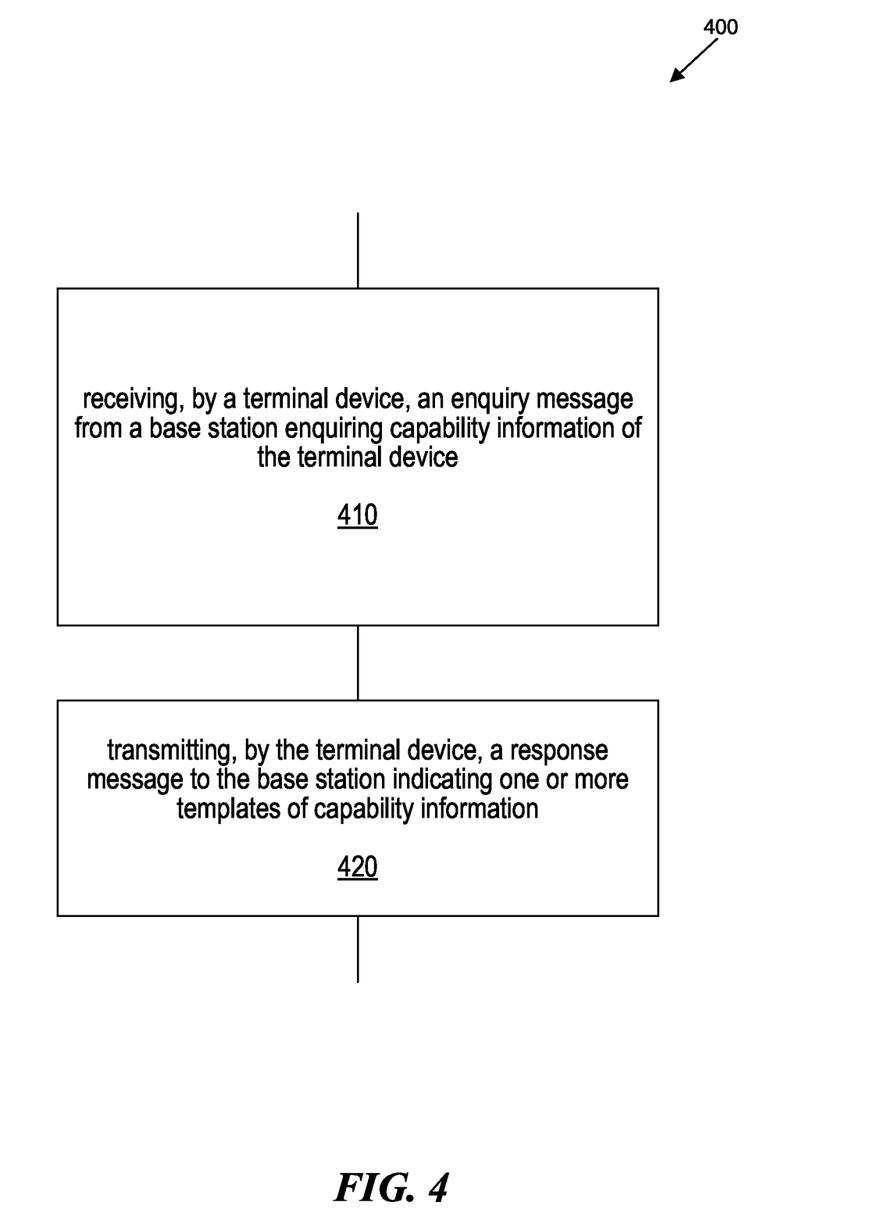
FIG. 4 is a flow chart representation of a method for wireless communication in accordance with one or more embodiments of the present technology.

FIG. 4 is a flow chart representation of a method for wireless communication in accordance with one or more embodiments of the present technology. The method 400 includes, at operation 410, receiving, by a terminal device, an enquiry message from a base station enquiring capability information of the terminal device. The enquiry message includes one or more radio access technologies and a list of frequency bands for communication between the base station and the terminal device. The method 400 includes, at operation 420, transmitting, by the terminal device, a response message to the base station indicating one or more templates of capability information determined according to the one or more radio access technologies and the list of frequency bands.

In some embodiments, a template of the one or more templates is represented using N bits, N being a positive integer (e.g., 1-4 bits). In some embodiments, the one or more templates are represented as multiple bits in a string variable of the response message (e.g., ue-CapabilityRAT-Container). In some embodiments, the capability information of the terminal device is organized into multiple groups, each group corresponding to a template. In some embodiments, the multiple groups comprise at least a first group having capability information elements associated with a radio access technology type, a second group having capability information elements associated with an extension feature (e.g., DC support or network slicing), or a third group having capability information elements associated with a network operator.

In some embodiments, the method includes receiving, by the terminal device, a different set of templates from the base station over a broadcast channel. The different set of templates represents system information of the base station. In some embodiments, the system information of the base station is organized into different groups, each corresponding to a template in the different set of templates. In some embodiments, the different groups comprise at least a fourth group having system information related to cell re-selection, or a fifth group having system information related to alerts or notification.

It is appreciated that, the techniques disclosed herein can be used to reduce signaling overhead and processing load for capability reporting by both UEs and base stations. Using the disclosed techniques allows efficient communications of the capability information and ensures that communication transitions (e.g., connection re-establishments between different cells) would not be hindered by the complexity of capability information transfers.

Computer System

Figure 5:
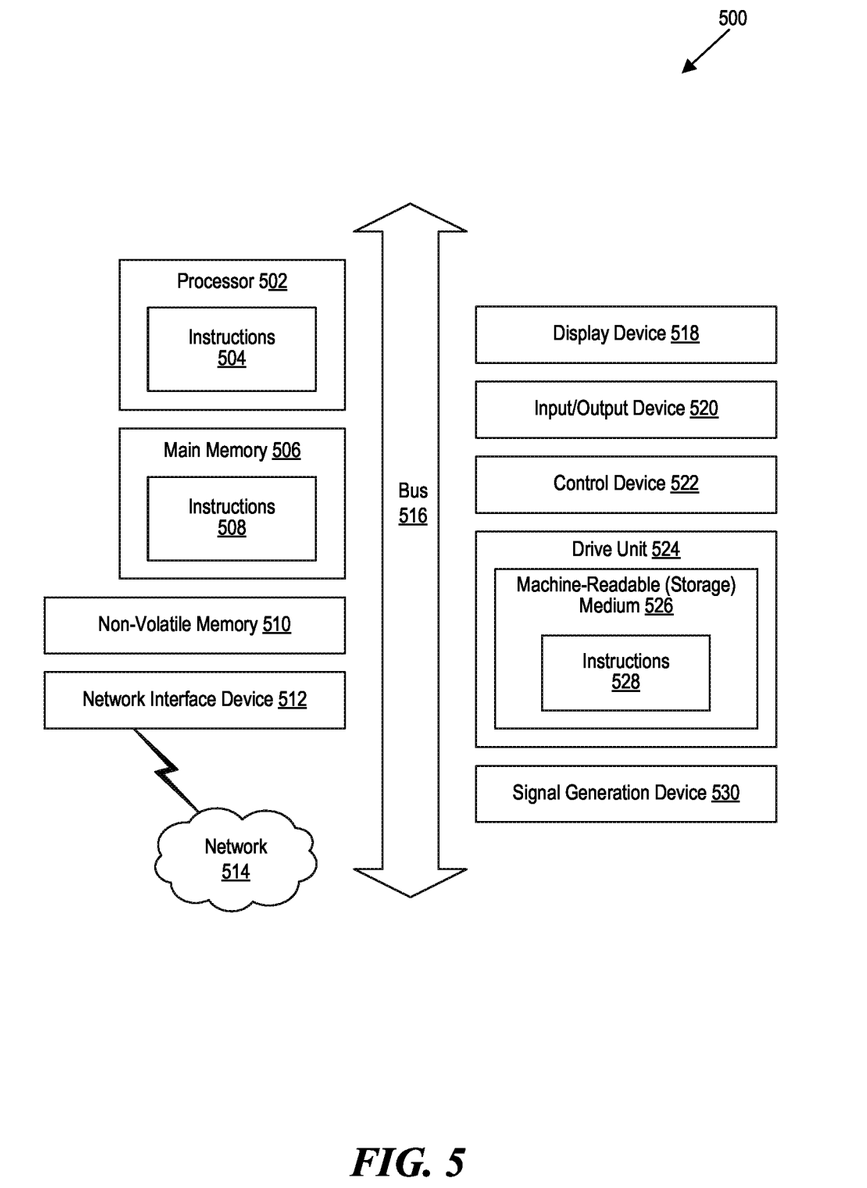
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable (storage) medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

I claim:

1. A terminal device for wireless communication, comprising a processor that is configured to:
   receive an enquiry message from a base station enquiring capability information of the terminal device, wherein the enquiry message includes one or more radio access technologies and a list of frequency bands for communication between the base station and the terminal device; and
   transmit a response message to the base station indicating one or more templates of capability information determined according to the one or more radio access technologies and the list of frequency bands,
      wherein the one or more templates are further determined based on a usage type of the terminal device indicating whether usage of the terminal device is for voice communication or data communication.

2. The terminal device of claim 1, wherein a template of the one or more templates is represented using N bits, N being a positive integer.

3. The terminal device of claim 1, wherein the one or more templates are represented as multiple bits in a string variable of the response message.

4. The terminal device of claim 1, wherein the capability information of the terminal device is organized into multiple groups each corresponding to a template.

5. The terminal device of claim 4, wherein the multiple groups comprise at least a first group having information elements associated with a radio access technology type, a second group having information elements associated with an extension feature, or a third group having information elements associated with a network operator.

6. A base station for wireless communication, comprising a processor that is configured to:
   transmit an enquiry message to a terminal device enquiring capability information of the terminal device, wherein the enquiry message includes one or more radio access technologies and a list of frequency bands for communication between the base station and the terminal device; and
   receive a response message from the terminal device indicating one or more templates corresponding to capability information of the terminal device, wherein the one or more templates are determined according to the one or more radio access technologies and the list of frequency bands,
      wherein the one or more templates are further determined based on a usage type of the terminal device indicating whether usage of the terminal device is for voice communication or data communication.

7. The base station of claim 6, wherein a template of the one or more templates is represented using N bits, N being a positive integer.

8. The base station of claim 6, wherein the one or more templates are represented as multiple bits in a string variable of the response message.

9. The base station of claim 6, wherein the capability information of the terminal device is organized into multiple groups, each group corresponding to a template.

10. The base station of claim 9, wherein the multiple groups comprise at least a first group having information elements associated with a radio access technology type, a second group having information elements associated with an extension feature, or a third group having information elements associated with a network operator.

11. A method for wireless communication, comprising:
    receiving, by a terminal device, an enquiry message from a base station enquiring capability information of the terminal device, wherein the enquiry message includes one or more radio access technologies and a list of frequency bands for communication between the base station and the terminal device; and
    transmitting, by the terminal device, a response message to the base station indicating one or more templates of capability information determined according to the one or more radio access technologies and the list of frequency bands;
       wherein the one or more templates are further determined based on a usage type of the terminal device indicating whether usage of the terminal device is for voice communication or data communication.

12. The method of claim 11, wherein a template of the one or more templates is represented using N bits, N being a positive integer.

13. The method of claim 11, wherein the one or more templates are represented as multiple bits in a string variable of the response message.

14. The method of claim 11, wherein the capability information of the terminal device is organized into multiple groups, each group corresponding to a template.

15. The method of claim 14, wherein the multiple groups comprise at least a first group having information elements associated with a radio access technology type, a second group having information elements associated with an extension feature, or a third group having information elements associated with a network operator.

16. The method of claim 11, further comprising:
    receiving, by the terminal device, a different set of templates from the base station over a broadcast channel, wherein the different set of templates represents system information of the base station.

17. The method of claim 16, wherein the system information of the base station is organized into different groups, each corresponding to a template in the different set of templates.

18. The method of claim 17, wherein the different groups comprise at least a fourth group having system information related to cell re-selection, or a fifth group having system information related to alerts or notification.

* * * * *